United States Patent
Drefahl et al.

[11] Patent Number: 5,957,003
[45] Date of Patent: Sep. 28, 1999

[54] ARMATURE FOR A MOTOR-VEHICLE STEERING WHEEL

[75] Inventors: Klaus Drefahl, Hanua; Martin Kreuzer, Kleinwallstadt, both of Germany

[73] Assignee: MST Automotive GmbH, Aschaffenburg, Germany

[21] Appl. No.: 08/903,961

[22] Filed: Jul. 31, 1997

[30] Foreign Application Priority Data

Aug. 10, 1996 [DE] Germany .................. 196 32 317

[51] Int. Cl.$^6$ ................................. B62D 1/04
[52] U.S. Cl. ............................................ 74/552
[58] Field of Search .................. 74/552; 280/778, 280/750; 29/894.1; D12/175, 176, 177

[56] References Cited

U.S. PATENT DOCUMENTS

| | | |
|---|---|---|
| 2,014,633 | 2/1996 | Pannecoucke . |
| 3,714,844 | 2/1973 | Tsuda ........................... 74/552 |
| 4,829,848 | 5/1989 | Shinto et al. ................... 74/552 |
| 5,490,435 | 2/1996 | Famili . |

FOREIGN PATENT DOCUMENTS

| | | |
|---|---|---|
| 0369520 | 11/1989 | European Pat. Off. . |
| 51-6420 | 2/1976 | Japan . |
| 1-123968 | 8/1989 | Japan . |
| 4-56577 | 4/1992 | Japan . |
| 887330 | 7/1981 | U.S.S.R. . |
| 318680 | 9/1929 | United Kingdom . |

*Primary Examiner*—Thomas R. Hannon
*Assistant Examiner*—Katrina B. Harris
*Attorney, Agent, or Firm*—Sprung Kramer Schaefer & Briscoe

[57] ABSTRACT

An armature for a motor-vehicle steering wheel. The hub, spokes, and rim are at least partly made out of a single sheet of metal. The metal is folded at the edge to produce a cross-section in the form of a U or L. The base of the section is essentially perpendicular to the axis of the steering wheel. The sides of the section essentially parallel that axis. The sides of the U or L are provided with an undulation as viewed longitudinally, that is almost non-existent in the vicinity of the base, and that increases continuously to a maximum as it approaches the edge.

8 Claims, 1 Drawing Sheet ously designed steering # ARMATURE FOR A MOTOR-VEHICLE STEERING WHEEL

BACKGROUND OF THE INVENTION

The present invention concerns an armature for a motor-vehicle steering wheel. The hub, spokes, and rim are at least partly made out of a single sheet of metal. The metal is folded at the edge to produce a cross-section in the form of a U or L. The base of the section is essentially perpendicular to the axis of the steering wheel and the sides of the section essentially parallel that axis. An armature of this type is known from U.S. Pat. No. 5,490,435.

Such armatures are employed to manufacture motor-vehicle steering wheels, They have the advantage that they can be made in one piece with all their components out of a single sheet-metal blank. The blank is folded and stamped or punched into its final form. Various parts are subjected to different stress, and their stability can be ensured by varying the dimensions of the U or L at different points.

Another requisite for steering wheels is that they must be able to accommodate the work of deformation that occurs when the driver is propelled against them in the event of an accident. Airbags, of course, do reduce the risk of injury to a very considerable extent, but an ideally designed steering wheel can help to reduce that risk even more.

SUMMARY OF THE INVENTION

The object of the present invention is accordingly a steering-wheel armature of the aforesaid type that will not only be cost-effective to manufacture but will also be ideally able to accommodate the greatest possible work of deformation without being more complicated to manufacture.

This object is attained in accordance with the present invention in the generic armature in that the sides of the U or L are provided with an undulation as viewed longitudinally, that is almost non-existent in the vicinity of the base, and that increases continuously to a maximum as it approaches the edge.

The resulting armature is intended to deform when subjected to excess stress in the event of an accident. Furthermore, the undulation can be varied to ensure that the "weaker" areas of the wheel will deform first and the "stronger" areas thereafter. Finally the areas involved in the deformation can be provided with "self-control" that will provide any particular armature with maximum deformability and hence minimize injury in the event of an accident.

The point of maximum stress on the armature when the driver is propelled against it and the initial deformation occurs cannot, of course, be precisely predicted. It is accordingly practical to provide the whole generic steering-wheel armature with an undulation in accordance with the present invention. The initial deformation can then occur at any point and propagate throughout the wheel.

The rim of the steering wheel will in any event yield downward in relation to the hub, which is secured to the relatively rigid steering-wheel column. The forces that occur in the side of the wheel facing the driver will in other words be tensile forces. If the undulating edges of the armature in accordance with the present invention face the driver, accordingly, they will tend to straighten out subject to the tension. An armature with an undulation in accordance with the present invention will accordingly yield essentially more readily subject to such forces than an armature without such an undulation would and will therefore be essentially better able to accommodate the work of deformation. Resistance to deformation will increase as the undulation straightens out and the propulsion of the driver's body will be increasingly braked, as is desirable from the aspect of preventing negative acceleration peaks and of promoting resilience.

The edges can of course also face in the opposite direction. In this event the undulation will be subject to compressive forces, and the edges will be further undulated. This version as well will be "softer" than an armature without undulation. A generic steering-wheel armature with an undulation in accordance with the present invention can accordingly be individually adapted to a wide range of demands without detriment of course to the rigidity needed during normal operation.

The initial resistance to deformation can be varied by varying the dimensions of the undulation and accordingly the stability of the sheet.

Advantageous embodiments of the theory behind the present invention are wherein the undulation of the sides is sinusoidal as viewed longitudinally, the undulation of the sides constitutes a series of opposing arcs as viewed longitudinally, or the undulation of the sides constitutes a series of rounded zigzags as viewed longitudinally. The deviation in the undulation of the sides can differ in extent from the plane of the original blank, and the period of the undulation of the sides can vary as viewed longitudinally. The folding can intentionally stress harden at least some of its material, the stress hardening can be intentionally eliminated from at least some of its area by heat treatment, the folding can be is carried out with respect to extent and location such that the steering wheel will be able to accommodate the maximum work of deformation in the event of crash-dictated deformation without excessive peak loads and the folding can be adjusted to the particular starting material employed.

Details will now be specified with reference to the embodiment illustrated by way of example in the FIGURE wherein:

BRIEF DESCRIPTION OF THE DRAWING

The FIGURE is a part of a steering wheel armature according to the invention.

DETAILED DESCRIPTION OF THE INVENTION

Figure 1:
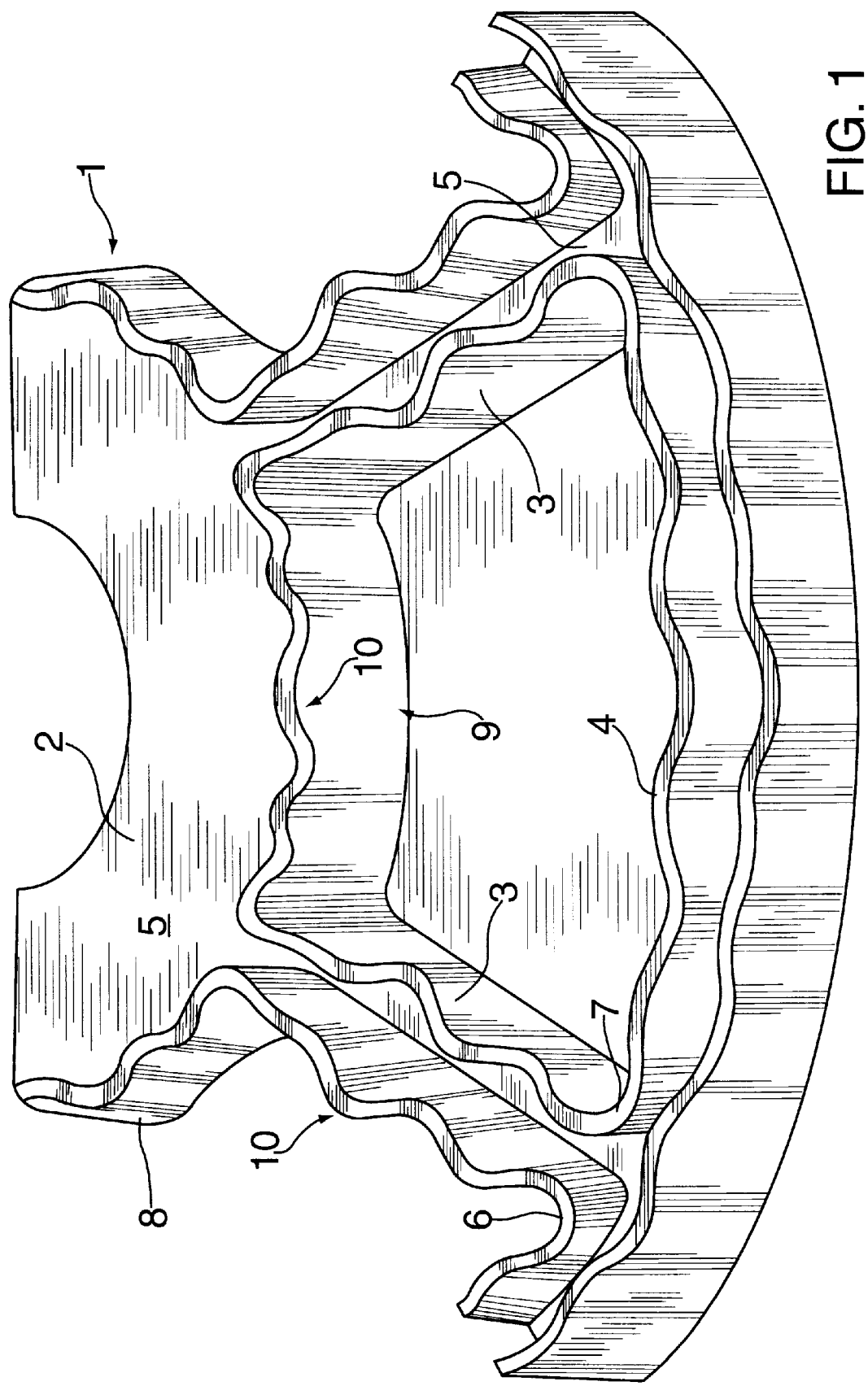

FIG. 1 illustrates part of a steering-wheel armature 1 shaped out of a blank of sheet metal by stamping, folding, and other non-abrasive processes. Armature 1 comprises a hub 2, spokes 3, and a rim 4, all in one piece. The webs have been folded at the edge to create a section in the shape of a U or L. The base 5 of the section extends within the plane of the original unfolded blank. The sides 6, 7, and 8 extend at essentially a right angle to base 5. Sides 6, 7, and 8 are progressively undulated. There is almost no undulation in the vicinity 9 of the base and the undulation increases to a maximum as it approaches the edge 10 of the section.

The undulation of the section in the illustrated embodiment is essentially sinusoidal. The shape can be undulated more or less tightly as needed and can in particular be varied to produce more or less "weak" areas in the armature.

The undulation can also be otherwise patterned. It can for example be in the form of a series of opposing arcs or zigzags. In conjunction with the other characteristics recited in the subsidiary claims, accordingly, the armature can be adapted to a wide variety of expectations. Simple tests can be conducted to easily determine what is needed to ensure the correct ratio of rigidity during normal operation to accommodation of the work of deformation that accompanies excess stress on the wheel in an accident. The strain hardening unavoidable in folding operations can be exploited as a design parameter or can to at least some extent be eliminated by heat treatment if necessary.

The undulation in the edge of the section of a generic steering-wheel armature in accordance with the present invention allows, in conjunction with other material and shaping properties the potential to satisfy all demands with respect to normal basic stability and the accommodation of the maximal work of deformation in the event of accident-dictated excess stress. In particular, practically every point in the steering-wheel armature can participate in accommodating the work of deformation.

We claim:

1. An armature for a motor-vehicle steering wheel, wherein a hub, spokes, and rim are at least partly made out of a single sheet of metal, wherein the metal is folded upwardly at an edge to produce a cross-section in the form of one of U and L, a base of the cross-section essentially perpendicular to an axis of a steering wheel in use and sides of the cross-section and essentially parallel said steering wheel axis and facing a driver during use, wherein the sides of the U or L are provided with undulation as viewed longitudinally, that is substantially zero in the vicinity of the base, and that increases continuously to a maximum as said undulation approaches the edge.

2. The armature as in claim 1, wherein the undulation of the sides is sinusoidal as viewed longitudinally.

3. The armature as in claim 1, wherein the undulation of the sides constitutes a series of opposing arcs as viewed longitudinally.

4. The armature as in claim 1, wherein the undulation of the sides constitutes a series of rounded zigzags as viewed longitudinally.

5. The armature as in claim 1, wherein a deviation in the undulation of the sides differs in extent from the plane of the sheet of metal.

6. The armature as in claim 1, wherein a period of the undulation of the sides varies as viewed longitudinally.

7. The armature as in claim 1, wherein at least a portion thereof has a stress hardening fold.

8. The armature as in claim 7, wherein the stress hardening is intentionally eliminated from at least some of its area by heat treatment.

* * * * *